(12) United States Patent
Pittman

(10) Patent No.: US 6,997,004 B1
(45) Date of Patent: Feb. 14, 2006

(54) AUTOMOBILE TRUNK AIR CONDITIONING SYSTEM

(76) Inventor: Ruby M. Pittman, 48 Marshall Pittman Rd., Sandy Hook, MS (US) 39478

(\*) Notice: Subject to any disclaimer, the term of this patent is extended or adjusted under 35 U.S.C. 154(b) by 0 days.

(21) Appl. No.: 10/926,664

(22) Filed: Aug. 27, 2004

(51) Int. Cl.
*B60H 1/32* (2006.01)

(52) U.S. Cl. ....................................... 62/244
(58) Field of Classification Search ............... 62/244
See application file for complete search history.

(56) References Cited

U.S. PATENT DOCUMENTS

| | | | |
|---|---|---|---|
| 1,744,154 A | 1/1930 | Bettag | |
| 2,797,631 A | 7/1957 | Davis | |
| 3,597,935 A * | 8/1971 | Pierrat | 62/163 |
| 3,850,006 A | 11/1974 | Redfern et al. | |
| 4,038,835 A * | 8/1977 | Arnieri | 62/244 |
| 4,658,599 A * | 4/1987 | Kajiwara | 62/239 |
| 4,674,294 A | 6/1987 | D'Agaro | |
| 4,955,203 A * | 9/1990 | Sundhar | 62/3.61 |
| 5,054,378 A * | 10/1991 | Speece | 454/137 |
| 5,101,711 A | 4/1992 | Durbin | |
| D330,488 S | 10/1992 | Daniels | |

\* cited by examiner

*Primary Examiner*—William E. Tapolcai
(74) *Attorney, Agent, or Firm*—Donald R. Schoonover

(57) ABSTRACT

A battery-powered air conditioning unit is mounted in the trunk of an automobile and is controlled by controls located on the dashboard of the automobile. The air conditioning unit will cool the trunk interior volume when activated whereby perishable items stored in the trunk can be kept in an air conditioned environment without being stored in the passenger compartment of the automobile.

1 Claim, 1 Drawing Sheet

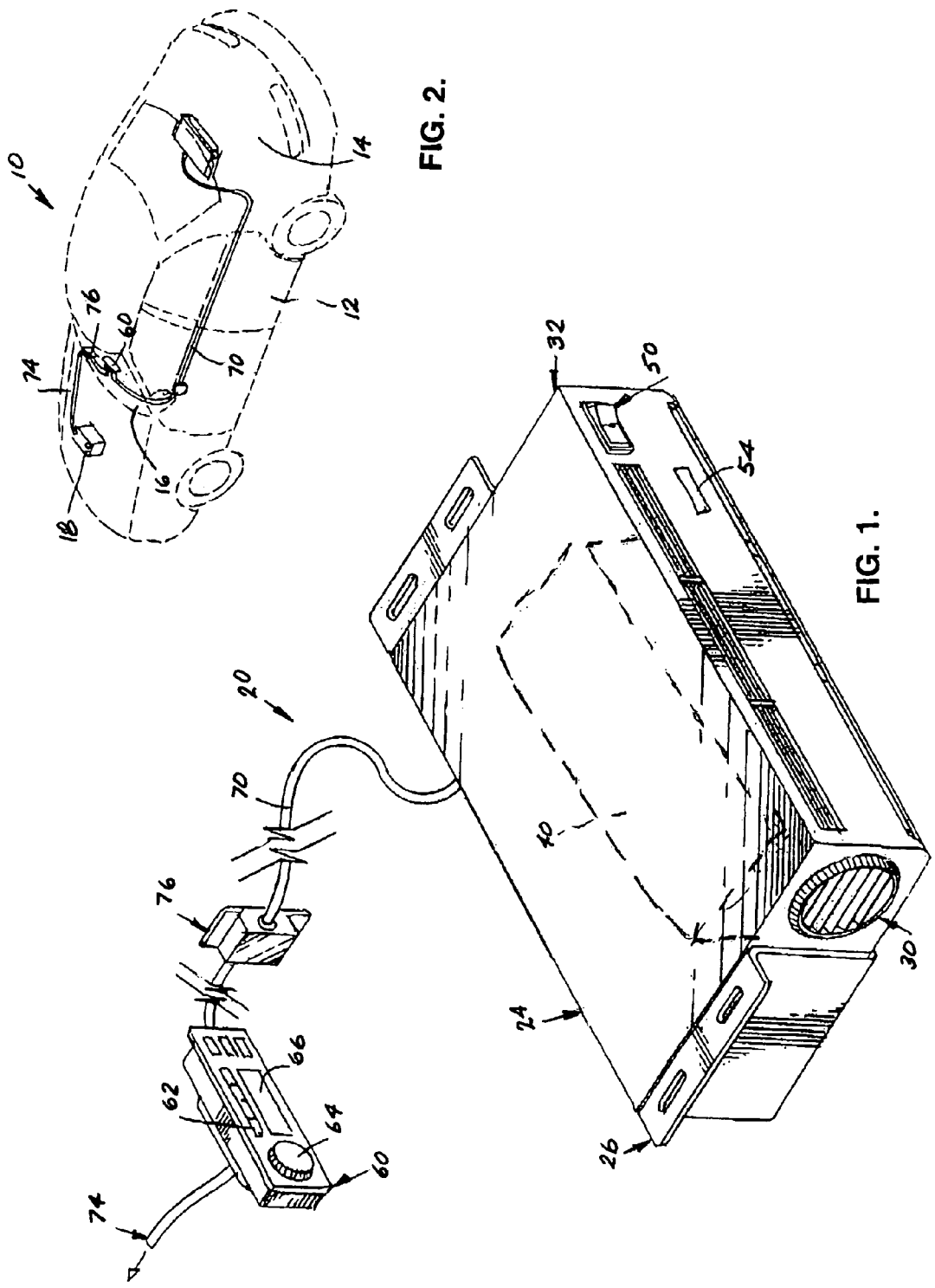

AUTOMOBILE TRUNK AIR CONDITIONING SYSTEM

BACKGROUND OF THE INVENTION

1. Field of the Invention

The present invention relates to the general art of refrigeration with a vehicle feature, and to the particular field of vehicle-contained refrigeration.

2. Discussion of the Related Art

Many people transport perishable items in their automobile. The most common form of such items are groceries. Many people, especially those living in warm climates, must rush home after completing a shopping trip in order to get perishable items into their refrigerator without exposing those items to the warm climate for a lengthy period of time.

Often, a total shopping trip includes a trip to one or more grocery stores as well as stops to other stores. However, if perishable items are purchased at one grocery store, a special trip home may be required before completing other stops. This is time consuming and wasteful of energy.

Therefore, there is a need for a means for protecting perishable items that are being stored in an automobile.

While many automobiles have air conditioning in the passenger compartment, the inventor is not aware of any automobile that has efficient air conditioning in the trunk of the automobile. Therefore, the trunk area of an automobile is likely to be very hot, especially so since it is a closed volume and there is no convection cooling available. Thus, the trunk area of an automobile is likely to be even hotter than an un-cooled passenger compartment.

Since most groceries are transported in the trunk area of an automobile, and the trunk is generally not exposed to the air conditioning of the automobile, the air conditioning does not reach the perishables stored in the trunk, and these perishables may be even more likely to spoil than if they were simply stored in the passenger compartment of the automobile. Many drivers also transport children on their errands. A child in a car seat may effectively remove most of the storage area in an automobile. This may make it very difficult to store items inside the automobile, and such items may have to be stored in the trunk, thereby raising the just-discussed problems.

Therefore, there is a need for a means for protecting perishable items that are being stored in the trunk of an automobile.

Fuel efficiency is a very important consideration in nearly all motor vehicles. It is well understood that most air conditioning systems associated with motor vehicles reduce the fuel efficiency of the motor vehicle. Thus, any added air conditioning system should not unduly tax the vehicle engine whereby fuel efficiency can be preserved as much as possible.

Therefore, there is a need for a means for protecting perishable items that are being stored in the trunk of an automobile without unduly affecting fuel efficiency of the automobile.

When perishable items are not being transported or stored in the trunk of an automobile, but the automobile is in use, it would be wasteful if the trunk were air conditioned.

Therefore, there is a need for a means for providing an air conditioned environment in the trunk of an automobile but only when needed.

PRINCIPAL OBJECTS OF THE INVENTION

It is a main object of the present invention to provide a means for protecting perishable items that are being stored in an automobile.

It is another object of the present invention to provide a means for protecting perishable items that are being stored in the trunk of an automobile.

It is another object of the present invention to provide a means for protecting perishable items that are being stored in the trunk of an automobile without unduly affecting fuel efficiency of the automobile.

It is another object of the present invention to provide a means for providing an air conditioned environment in the trunk of an automobile but only when needed.

SUMMARY OF THE INVENTION

These, and other, objects are achieved by an air conditioning system that includes an air conditioning unit mounted in the trunk of an automobile and which is powered from the battery of the automobile. Controls for the air conditioning unit are located on the dashboard of the automobile so the unit can be turned on and off from within the automobile.

Using the trunk air conditioning unit embodying the present invention will permit the trunk area to be air conditioned when needed, and not at other times. Since the unit is battery powered, it will not unduly tax the automobile engine so fuel efficiency can be preserved. Therefore, someone transporting perishable items, such as groceries, can place those items in a cool environment during transport. The items can be stored in the trunk of the automobile thereby leaving the interior passenger area of the automobile free for other uses.

The unit embodying the present invention is easily retrofit onto an existing automobile and thus present automobiles can obtain the benefits associated with the unit of the present invention without requiring the car be returned to the manufacturer or placed in a special shop.

It is noted that while perishable items are specifically discussed, the scope of the present disclosure is not intended to be limited to simply perishable items but can include any item that may be damaged, or may cause damage, due to overheating. For example, if aerosol products are stored in an environment that becomes too hot, damage may occur if the product explodes. Other examples will occur to those skilled in the art based on the teaching of the present disclosure. Such examples are also intended to be within the scope of this disclosure as well.

BRIEF DESCRIPTION OF THE DRAWING FIGURES

FIG. 1 is a perspective view of a trunk air conditioning system embodying the present invention.

FIG. 2 is a perspective view of a trunk air conditioning system embodying the present invention in place on an automobile.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in an air conditioning system 10. Air conditioning system 10 comprises an automobile 12 which includes a trunk 14, a dashboard 16 inside the automobile 12, and a battery 18. Trunk 14 has an interior volume in which items are stored in the normal manner.

As above discussed, if trunk 14 is used to transport and store perishable items, the interior volume should be as cool as possible. To this end, system 10 includes an air conditioning unit 20 which is located in the trunk of automobile 12.

Air conditioning unit 20 includes a housing 24 having mounting brackets 26 thereon. Mounting brackets 26 are fixed to automobile 12 in trunk 14 when air conditioning unit 20 is mounted on automobile 12. Preferably, housing 24 is mounted in a top area of the trunk 14 to be out of the way.

An air intake port 30 is located on housing 24 and is fluidically connected to the interior volume of the trunk when air conditioning unit 20 is mounted on automobile 12.

An air exhaust port 32 is substantially identical to the intake port 30 and is mounted on the opposite side of housing 24 that is opposite to intake port 30 and is fluidically connected to the interior volume of the trunk when air conditioning unit 20 is mounted on automobile 12 as shown in FIG. 2.

An air cooling unit 40 is located inside housing 24 and is fluidically connected to air intake port 30 and to air exhaust port 32 whereby air flowing from the air intake port 30 to the air exhaust port 32 is cooled by air cooling unit 40 when air conditioning system 20 is operating. Air cooling unit 40 is known and the particular details of the air cooling unit 40 are not claimed as part of the invention. Accordingly, the details of the air cooling unit 40 will not be presented in detail.

An on/off switch 50 is located on housing 24 and is connected to air cooling unit 40. The air cooling unit 40 is turned on using switch 50 when the trunk interior volume is to be cooled. Otherwise, switch 50 is used to keep the unit 40 turned off.

A temperature sensor 54 is fluidically connected to the interior volume of the trunk and is mounted on housing 24. The temperature sensor 54 can be connected to the air cooling unit 40 to de-activate that unit 40 when the temperature in the trunk falls to or below a set value, or to activate the unit 40 when temperature in the trunk reaches or exceeds a pre-set value.

An air conditioning unit control system 60 is located on dashboard 16 of the automobile and is used by a driver or a passenger to control the climate of the interior volume of the trunk via control of the air conditioning unit 20. System 60 includes an on/off switch 62, a temperature control switch 64, and a readout display screen 66 which is electrically connected to temperature sensor 54. Thus, the temperature of the interior volume of the trunk will be displayed for the operator to monitor. Control switch 64 is used in conjunction with display screen 66 to set a temperature in the trunk of the automobile, and temperature sensor 54 can be used to maintain that set temperature.

An electrical connection 70 electrically connects air conditioning unit control system 60 to air conditioning unit 20. In the form shown in FIG. 2, connection 70 is an electrical lead.

An electrical connection 74 electrically connects air conditioning unit control system 60 to battery 18 of automobile 12 and has a fuse 76 interposed between system 60 and battery 18 to protect against surges, shorts and the like. On/off switch 62 on the air conditioning unit control system 60 is electrically interposed between battery 18 and on/off switch 50 on housing 24 of the air conditioning unit 20. This permits a driver to override the operation of the air cooling unit 40 if desired.

Operation of system 10 can be understood from the foregoing disclosure and thus will not be presented in detail. Once a perishable item is placed in the trunk of the automobile, on/off switch 50 is moved into an "on" position, and the trunk closed. Then, on/off switch 62 is moved into an "on" position to activate air cooling unit 40 to cool the interior volume of the trunk. As can be understood, unit 40 is powered from battery 18 and thus should not significantly reduce the gas milage of automobile 12. The temperature inside the trunk is monitored via display screen 66 and the air cooling unit 40 is controlled using temperature control switch 64 to cool the trunk or allow temperature in the trunk to increase as suitable. Air conditioning system 20 can be turned off using either switch 50 or switch 62 so an operator need not remember to de-activate the system using switch 50. Since a person will be concentrating on removing items from the trunk and placing those items in the proper storage facility, it is possible that de-activation of the system via switch 50 can be forgotten. However, it is easy to remember to de-activate the system using switch 62 and thus desired de-activation is likely.

It is understood that while certain forms of the present invention have been illustrated and described herein, it is not to be limited to the specific forms or arrangements of parts described and shown.

The invention claimed is:

1. An air conditioning system comprising:
   (a) an automobile which includes a trunk, a dashboard inside said automobile, and a battery;
   (b) an air conditioning unit which is located in the trunk of said automobile and which includes
      (1) a housing having mounting brackets thereon, the mounting brackets being fixed to said automobile in the trunk of said automobile when said air conditioning unit is mounted on said automobile,
      (2) an air intake port on the housing and fluidically connected to the interior volume of the trunk when said air conditioning unit is mounted on said automobile,
      (3) an air exhaust port on the housing and fluidically connected to the interior volume of the trunk when said air conditioning unit is mounted on said automobile,
      (4) an air cooling unit inside the housing fluidically connected to the air intake port and to the air exhaust port whereby air flowing from the air intake port to the air exhaust port is cooled by the air cooling unit when said air conditioning system is operating,
      (5) an on/off switch on the housing and connected to the air cooling unit, and
      (6) a temperature sensor fluidically connected to the interior volume of the trunk;
   (c) an air conditioning unit control system located on the dashboard of said automobile and including
      (1) an on/off switch,
      (2) a temperature control switch, and
      (3) a readout display screen connected to the temperature sensor of said air conditioning unit;
   (d) an electrical connection electrically connecting said air conditioning unit control system to said air conditioning system;
   (e) an electrical connection electrically connecting said air conditioning unit control system to the battery of said automobile and including a fuse, the on/off switch on said air conditioning unit control system being electrically interposed between the battery and the on/off switch on the housing of said air conditioning unit.

* * * * *